United States Patent [19]

Hous

[11] Patent Number: 5,200,469

[45] Date of Patent: Apr. 6, 1993

[54] CROSSLINKED ELASTOMERIC POLYMERS AND PROCESS FOR PRODUCING THE SAME

[75] Inventor: Pierre Hous, Steenokkerzeel, Belgium

[73] Assignee: Exxon Chemical Patents Inc., Linden, N.J.

[21] Appl. No.: 510,737

[22] Filed: Apr. 18, 1990

[51] Int. Cl.⁵ .................. C08F 255/08; C08F 279/02; C08G 67/00

[52] U.S. Cl. .................................... 525/245; 525/244; 525/267; 525/304; 525/310; 525/313; 525/282; 528/392

[58] Field of Search ............... 525/244, 245, 282, 267, 525/304, 310, 313; 528/392

[56] References Cited

U.S. PATENT DOCUMENTS

| | | | |
|---|---|---|---|
| 2,996,473 | 8/1961 | Cain et al. | 260/41 |
| 3,033,838 | 5/1962 | Ray | 260/85.3 |
| 4,014,852 | 3/1977 | Gesslev et al. | 525/237 |
| 4,166,892 | 9/1979 | Maeda et al. | 525/373 |
| 4,431,775 | 2/1984 | Maeda et al. | 525/193 |
| 4,721,756 | 1/1988 | Louie et al. | 525/334.1 |
| 4,803,250 | 2/1989 | Nagasaki et al. | 525/329.3 |

OTHER PUBLICATIONS

K. Ho "Diels-Adler Reaction Curing of Chlorobutyl Rubber By Bis-Maleimides" Rubber Chemistry & Technology, vol. 42, pp. 42-54, (1989).

Vukov et al., "Crosslinking Efficiency of Some Halobutyl Curing Reactions", ACS meeting-Oct. 23-26, 1984 (copy thereof to be forwarded later).

*Primary Examiner*—James J. Seidleck
*Assistant Examiner*—Vasu S. Jorgannathan
*Attorney, Agent, or Firm*—H. L. Cohen; M. L. Gibbons; J. E. Schneider

[57] ABSTRACT

A crosslinked, unsaturated elastomeric polymer of a $C_4$ to $C_7$ isomonoolefin and a $C_4$ to $C_{14}$ conjugated multiolefin is produced by curing the corresponding uncrosslinked polymer having a low level of chemically bound halogen with a curing agent which reacts only with the halogen (e.g., zinc oxide) in combination with a bifunctional dienophile (e.g., a bismaleimide). The uncrosslinked elastomeric polymer is particularly suitable for use in the pharmaceutical industry, for example, for container closures. Shaped rubbery products comprising the crosslinked copolymer are also provided.

38 Claims, No Drawings

CROSSLINKED ELASTOMERIC POLYMERS AND PROCESS FOR PRODUCING THE SAME

BACKGROUND OF THE INVENTION

1. Field of the Invention

The present invention relates to crosslinked elastomeric polymers suitable for use in the pharmaceutical industry.

2. Description of Information Disclosures

Rubber products, such as stoppers and linings for closures of containers used in the pharmaceutical industry, are in contact with pharmaceutical products which may extract some of the components of the rubber product and result in a contaminated pharmaceutical product which is discarded. The extraction problem is particularly exhibited when the rubber product is in contact with certain types of antibiotic formulations.

To overcome the problem of components being exuded from the rubber, higher purity rubber products containing less and fewer components which can be extracted from the rubber product by the pharmaceutical formulation are needed.

U.S. Pat. No. 4,721,756 discloses molded products, such as stoppers, eye drop tips and the like for use in the pharmaceutical industry. The molded rubber products are made from a composition comprising a halogenated butyl rubber and a curing system comprising specified amounts of zinc oxide and m-phenylene bismaleimide. The composition is formed in a premold and, thereafter, molded into shape by molding at a pressure of at least 500 psi at a temperature of up to 375° F. for five minutes.

U.S. Pat. No. 4,803,250 discloses rubber compositions containing a sulfur vulcanization system comprising a sulfenamide type accelerator and a bismaleimide compound. The rubber component may be chloroprene.

U.S. Pat. No. 4,166,892 and U.S. Pat. No. 4,431,775 disclose a process for vulcanizing a rubber base comprising a halogen-containing amorphous polymer in the presence of a vulcanizing agent such as an organic peroxide and at least one member of the group selected from certain oxides of metals (e.g., zinc oxide); methacrylic esters; maleimides such as N,N'-m-phenylene bismaleimide; oximes and the like.

U.S. Pat. No. 2,996,473 discloses curing a halogenated copolymer of ethylene and an alpha olefin with a curing mixture which comprises a metal-containing substance, such as zinc oxide, and an organic polythiocarbonate.

U.S. Pat. No. 3,033,838 discloses that halogen-containing butyl type rubbers are vulcanizable with zinc oxide.

K. Ho et al, "*Diels-Alder Reaction Curing of Chlorobutyl Rubber by Bis-Maleimides*", Rubber Chemistry and Technology, vol. 62, pages 42 to 54, 1989 discloses that chlorinated butyl rubber can be crosslinked with N,N'-m-phenylene bis-maleimide via the diene groups on the chain generated by reaction with zinc oxide.

Vukov et al, "*Crosslinking Efficiency of Some Halobutyl Curing Reactions*", paper presented at the ACS Rubber Division Meeting, Denver, Colo., October 23-26, 1984, discloses the use of m-phenylene bis-maleimide and zinc oxide in crosslinking system for halobutyl rubber.

Crosslinked elastomers are known in which the molecular chains are crosslinked at the sites of the carbon to carbon double bond, of the uncrosslinked initial polymer, as well as at the site of other functional groups present in the uncrosslinked polymer, such as, for example at the site of chemically-bound halogen.

Partially crosslinked polymers are known such as those disclosed in U.S. Pat. Nos. 2,781,334 and 2,729,626 in which the polymers are prepared by copolymerizing an isoolefin with a conjugated diolefin and a divinyl benzene. Such polymers require the use of divinyl benzene in its preparation as well as the use of the isoolefin and the conjugated diolefin. A brochure of Polysar Corporation discloses Polysar® Butyl Terpolymers such as XL 10,000 (previously XL-20), including Polysar® Butyl Terpolymer XL 40302 which is described as a halogenated type (printed in Canada, 1988).

Halogenated butyl rubber having a low level of halogen e.g., chlorine content of about 0.5 mole percent (about 0.3 wt. %) and a low level of non-halogenated isoprene unsaturation are disclosed in a paper entitled "Chlorobutyl Designed for Curing Members" authored by J. V. Fusco, I. J. Gardner, P. Hous and D. S. Tracey presented at a meeting of the Rubber Division, American Chemical Society, Mexico City, Mexico, May 9–12, 1989, paper No. 57, and in European patent application number 89310227.7 filed Oct. 5, 1989.

Numerous patents disclose halogenated butyl rubber containing various amounts of chemically bound halogen, for example, U.S. Pat. No. 2,631,984 discloses brominated butyl rubber containing at least 0.5 weight percent bromine; U.S. Pat. No. 2,732,354 discloses chlorinated butyl rubber containing from 0.4 to 2.3 weight percent chlorine; U.S. Pat. No. 3,099,644 discloses a process for the continuous halogenation of butyl rubber to produce a halogenated rubber containing 1.13 weight percent chlorine. U.S. Pat. No. 2,732,354 discloses chlorinated butyl rubber containing from about 0.4 to 2.3 weight percent of chlorine. U.S. Pat. No. 2,944,578 describes compositions comprising chlorinated butyl rubber in which the butyl rubber has been substitutively chlorinated to contain at least 0.5 weight percent chlorine; FIG. II of this patent appears to include a data point at about 0.6 wt. percent chlorine. U.S. Pat. No. 3,099,644 discloses a process for the continuous halogenation of butyl rubber to produce a halogenated rubber containing 1.13 weight percent chlorine. U.S. Pat. No. 2,943,664 discloses adhesive compositions for tire cords comprising chlorinated butyl rubber containing at least 0.5 percent by weight of combined chlorine. U.S. Pat. No. 2,964,489 discloses a process for the production of tubeless tires and curing bladders containing 0.5 weight percent chlorine. The chlorine content of known chlorinated butyl rubber is typically defined by a formula, as shown, for example, in U.S. Pat. No. 2,964,489 (column 2, lines 50–60) and expressed as being "at least 0.5 wt. percent (preferably at least about 1.0 wt. percent) combined chlorine." In a restatement of the chlorine concentration, it is stated that there should be "at least 0.2 and preferably at least about 0.5 weight percent of combined chlorine in the polymer." (id, lines 60–62). U.S. Pat. No. 4,130,534 discloses elastoplastic compositions comprising a blend of thermoplastic crystalline polyolefin resin and a butyl rubber, crosslinked to the extent that it is at least 90 percent gelled. It defines butyl rubber (at column 5, lines 17–34) to include "copolymers of isobutylene and isoprene containing 0.5 to 10, more preferably 1 to 4 percent by weight isoprene and said copolymers halogenated with from 0.1 to about 10, preferably 0.5 to 3.0 weight percent chlorine or bromine which chlorinated copolymer is commonly called chlorinated butyl rubber".

U.S. Pat. No. 3,758,643 and U.S. Pat. No. 3,862,106 (W. K. Fischer) disclose a partially crosslinked EPDM polymer having a gel content of at least 30 percent but less than 90 percent by weight as measured by immersion in cyclohexane for 48 hours at 73° F.

It is known to perform melt phase reaction of polymers in continuous flow devices, such as extruder-reactors. See, for example, U.S. Pat. Nos. 4,513,116; 4,548,995; 4,554,326, and 4,563,506, the teachings of which are hereby incorporated by reference.

U.S. Pat. No. 4,594,390 discloses the use of an extruder to prepare thermoplastic compositions comprising a blend of plastic and cured rubber.

It has now been found that a crosslinked, unsaturated copolymer prepared by crosslinking a specified halogen-containing copolymer utilizing a specified curing mixture has a decreased tendency to exude into pharmaceutical formulations.

SUMMARY OF THE INVENTION

In accordance with the invention, there is provided a process for preparing a crosslinked unsaturated copolymer of a $C_4$ to $C_7$ isomonoolefin and a $C_4$ to $C_{14}$ conjugated multiolefin, which comprises the steps of: contacting, at crosslinking conditions, an uncrosslinked, unsaturated halogen-containing copolymer of a $C_4$ to $C_7$ isomonoolefin and a $C_4$ to $C_{14}$ conjugated multiolefin comprising an unsaturated non-halogen-containing moiety and an unsaturated chemically bound allylic halogencontaining moiety, said halogen being selected from the group consisting of from about 0.05 to 0.4 weight percent chlorine, from about 0.05 to 0.5 weight percent bromine and mixtures thereof in the presence of a curing mixture comprising (a) at least one curing agent which reacts essentially only with said allylic halogen; and (b) at least one bifunctional dienophile selected from the group consisting of a bismaleimide, a polyacrylate, a methacrylic ester, and mixtures thereof.

In accordance with the invention, there is also provided the crosslinked unsaturated copolymer produced by the above-stated process.

DETAILED DESCRIPTION OF THE INVENTION

The crosslinked, unsaturated copolymers of a $C_4$ to $C_7$ isomonoolefin and $C_4$ to $C_{14}$ conjugated multiolefin of the present invention have covalent crosslinks which are randomly distributed and an olefinic unsaturation ranging from about 0.05 to about 5.0 mole percent, preferably from about 0.50 to about 2.5 mole percent, more preferably from about 0.10 to about 2.0 mole percent. The gel content of the crosslinked unsaturated copolymers of the invention ranges from about 90 wt. percent to about 100 wt. percent, preferably from about 95 to about 100 wt. percent, as measured by soaking a sample of the material in cyclohexane for about 48 hours at about 23° C. The crosslinks are formed after the polymerization of the isomonoolefin with the conjugated multiolefin and after the halogenation thereof. The crosslink density of the total crosslinked polymer may range from about 0.15 to about $0.50 \times 10^{-4}$ moles per cubic centimeter, preferably from about 0.20 to about $0.40 \times 10^{-4}$ moles per cubic centimeter. The crosslink density of the polymer is determined by equilibrium solvent swelling using the Flory-Rehner equation, J. Rubber Chem. and Tech., 30, p. 929. The appropriate Huggins solubility parameter for butyl rubber/cyclohexane, 0.433 used in the calculation was obtained from the review article by Sheehan and Bisio, J. Rubber Chem and Tech., 39, 167.

The crosslinked copolymers of the present invention are substantially free of chemically bound halogen. By the term "substantially free of chemically bound halogen" is intended herein, a crosslinked copolymer comprising less than about 0.1 weight percent chemically bound halogen, preferably less than about 0.06 wt. percent chemically bound halogen.

The average molecular weight between crosslinks ($M_c$) of the crosslinked unsaturated elastomeric polymers of the invention as calculated from the crosslink density and the equation $$2 M_c = \frac{\text{Rubber density}}{\text{Crosslink density}} = \frac{0.92 \text{ (g/cm}^3\text{)}}{\text{crosslink density (moles/cm}^3\text{)}}$$

may range from about 30,000 to about 9,000 which is equivalent to from about 0.15 to about 0.50 moles of crosslinks per $cm^3$.

PROCESS FOR THE PREPARATION OF THE CROSSLINKED UNSATURATED ELASTOMERIC POLYMERS

The crosslinked, unsaturated copolymers of the present invention are prepared by contacting an uncrosslinked, unsaturated halogen-containing polymer of a $C_4$ to $C_7$ isomonoolefin and a $C_4$ to $C_{14}$ conjugated multiolefin comprising at least one unsaturated monomeric moiety which does not have a chemically bound halogen and at least one unsaturated moiety which has a chemically bound allylic halogen with a curing mixture comprising at least one curing agent which reacts essentially only with the allylic halogen and at least one bifunctional dienophile for a time sufficient to form covalent crosslinks at the allylic halogen sites.

The term "bifunctional dienophile" is used herein to denote a material, such as a compound, which comprises at least two carbon to carbon double bonds to enable the material to react with a conjugated diene via a DIELS-ALDER reaction mechanism and to react to obtain a crosslink.

When the halogen atom is removed from the halogenated isoprene moieties of the copolymer of the present invention, some of the sites from which the halogen has been removed undergo side reactions such as formation of a conjugated diene (i.e., two carbon to carbon conjugated double bonds). Use of a dienophile in combination with the curing agent permits reaction of the thus formed dienes with the dienophile to form crosslinks via the conjugated diene groups on the chain generated by reaction with the curing agent (dehydrohalogenating agent).

The curing agents which react essentially only with the allylic halogen are metal components selected from the group consisting of metal salts, metal oxides, metal powders and mixtures thereof wherein the metal of the metal component is selected from metals of Group IIA and IIB of the Periodic Table of Elements, copper, iron and mixtures thereof. Preferably, the curing agent is a metal oxide, sulfide, phosphate, and organic salts of zinc, cadmium, manganese, iron and lead. The more preferred curing agent is zinc oxide.

The bifunctional dienophile component of the curing mixture useful in the practice of the present invention include bismaleimide, polyacrylates, methacrylic esters, para-benzoquinones, and mixtures thereof.

Suitable bismaleimides are compounds represented by the general formula:

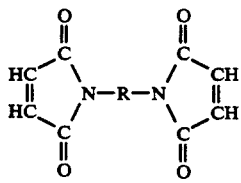

wherein R is a divalent acyclic aliphatic group, cyclic aliphatic group, aromatic group, alkylaromatic group. These groups may optionally contain a hetero atom selected from the group consisting of O, N, and S in their chain or side substituent. Preferably, the bismaleimide is an aliphatic bismaleimide or an aromatic bismaleimide. More preferably, the bismaleimide is an aromatic bismaleimide, such as, for example, N,N'-m-phenylene bismaleimide; 1,4-dithiobis-(phenylmaleimide); 4,4-methylenebis(phenylmaleimide); N,N'-p-phenylene-bis-maleimide; N,'N'-p-phenylether bismaleimide.

The preferred bismaleimide compound is N,N'-m-phenylene bismaleimide.

Suitable methacrylic esters include diethylene glycol dimethacrylate; 1,3-butylene dimethacrylate; triethylolpropane trimethacrylate, and the like.

Suitable polyacrylates include hexane diol diacrylate; diethylene glycol diacrylate; pentaerythritol tetracrylate; 1,6-hexamethylene diacrylate, and mixtures thereof.

The curing mixture may also comprise optional additional accelerators or activators agents such as fatty acids, for example, stearic, palmitic, lauric, sebacic, abietic, neodecanoic acids; weak amines; salts of these two groups; polyalcohols; amino alcohols e.g., trienanolamine; ethylene glycol; diamine; mercaptobenzimidazole; etc.

Other rubber compounding additives and fillers may optionally be added before, during or after the curing step to the composition comprising the uncrosslinked copolymer and curing mixture of the present invention, such as for example, fillers including carbon black, talc, clays, pigments and the like in amounts up to about 50 weight percent based on the weight of the total composition. Suitable optional additives include antioxidants, stabilizers, antistatic agents and the like coventionally used in the rubber compounding art.

Suitable curing conditions include a temperature ranging from about 100° to 260° C., preferably from about 170° to 210° C., for a time period ranging from above zero to about 15 minutes. The pressure is not critical.

The Periodic Table of Elements referred to herein is in accordance with the table published by Sargent-Welch, copyright 1968, Sargent-Welch Scientific Company.

It is important to conduct the curing step of the present invention in the absence of a curing agent which could react effectively with the non-halogenated unsaturated moiety of the uncrosslinked initial copolymer to prevent crosslinking at the unsaturated sites (carbon-to-carbon double bond) of the non-halogenated unsaturated moiety.

Suitable amounts of curing agent to be used in the process of the present invention include a molar ratio of curing agent to bound halogen in the uncrosslinked halogenated initial polymer of at least 0.25:1, preferably at least about 0.5:1. The upper limit is not critical and may suitably be 10:1, preferably 7:1 more preferably 5:1. For use in pharmaceutical closures, it is preferred to use the minimum amount of curing agent needed to attain the desired crosslink density.

Suitable amounts of bifunctional dienophile to be used in the process of the present invention include a molar ratio of dienophile to bound halogen in the uncrosslinked (halogenated) initial polymer of at least 0.25:1, preferably at least 0.5:1. It should be noted that one mole of either zinc oxide or the dienophile can react with two halogen atoms. Therefore, a 0.5:1 molar ratio of either zinc oxide or dienophile means a 1:1 equivalent ratio. Stated differently, half a mole of a bifunctional dienophile can react with one atom of halogen.

If desired, the uncrosslinked halogenated polymer is contacted at conditions, (e.g., including a sufficient time period) for the curing mixture to react with substantially all the chemically bound halogen of the initial uncrosslinked polymer and, thereby, produce a covalently crosslinked polymer substantially free of chemically bound halogen.

The curing agent of the present invention may be used in stoichiometric excess over the chemically bound halogen of the initial uncrosslinked polymer.

The curing agent (e.g. ZnO) can be used in excess, although low levels are preferred for purity. The bifunctional dienophile is used, preferably, not in excess of the halogen stoichiometry.

The curing step may be conducted under static conditions, for example, in an autoclave, a curing press etc., or under dynamic conditions, e.g., in an extruder or internal mixer.

The contacting zone for the curing step of the present invention may be in an internal mixer and may be a batch-wise or continuous process, (e.g.), (Banbury ®, Brabender ® or extruder type). Suitable continuous flow devices include kneaders, extruders (employing single or multiple screws, e.g., twin screws), continuous mixers and a blending/extrusion device referred to as a cavity transfer mixer as described in U.S. Pat. No. 4,419,014, the teachings of which are hereby incorporated by reference.

The composition of the present invention may be used to produce shaped articles, for example, pharmaceutical container closures, cap liners, eye drop dispensers, and the like.

Suitable pharmaceutical container closures, cap liners or eye drop dispenser compositions may be prepared by using conventional mixing techniques including, e.g., kneading, roller milling, extruder mixing, internal mixing (such as with a Banbury ® mixer), etc. The sequence of mixing and temperatures employed are well known to the skilled rubber compounder, the objective being the dispersion of fillers, activators and curatives in the polymer matrix without excessive heat buildup. A useful mixing procedure utilizes a Banbury mixer in which the copolymer rubber, carbon black and plasticizer are added and the composition mixed for the desired time or to a particular temperature to achieve adequate dispersion of the ingredients. Alternatively, the rubber and a portion of the carbon black (e.g., onethird to two-thirds) is mixed for a short time (e.g., about 1 to 3 minutes) followed by the remainder of the carbon black and oil. Mixing is continued for about 5 to 10 minutes at high rotor speed during which time the mixed compound reaches a temperature of about 140° C. Following cooling, the compound is mixed in a second step on a rubber mill during which the curing agent, e.g. zinc oxide and curing resin are thoroughly and uniformly dispersed at relatively low temperature, e.g., about 80° to about 105° C. Variations in mixing will be readily apparent to those skilled in the art and the present invention is not limited by the mixing procedure. The mixing is performed to disperse all components of the composition thoroughly and uniformly.

Shaped articles may be formed from the composition of the present invention by extrusion, injection molding or compression molding.

Vulcanization of a molded article, for example, a container closure, such as a stopper, may be carried out in heated presses under conditions well known to those skilled in the art.

It is preferred that vulcanization be effected at temperatures of about 140° to about 185° C. and for periods of about 10 to about 60 minutes. Curing time will be affected by the thickness of the article to be shaped and the concentration and type of curing agent as well as halogen and unsaturation content of the halogenated copolymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084.

The shaped (e.g., molded) rubber product comprising the crosslinked copolymer of the present invention because of its low isoprene level, and being substantially free of halogen and comprising a low level of curing agent residue is particularly suited for use in the pharmaceutical industry for uses which require contact of the molded rubber product with pharmaceutical formulations such as antibiotic formulations. The shaped rubber product may be a rubber stopper, a coating or lining for closures (e.g., crow closure) or coating for other materials that may be in contact with the pharmaceutical formulation. The shaped rubber product may also be use as eye drop dispenser and the like.

A preferred composition to prepare, for example, molded rubber products of the present invention is shown in Table I.

TABLE I

| Ingredient | Parts per 100 parts of uncrosslinked halogenated copolymer starting material |
|---|---|
| Uncrosslinked halogenated copolymer starting material | 100 |
| zinc oxide | 1–10 |
| bismaleimide | 1–2 |
| talc | 20–40 |
| clay | 40–70 |
| oil | 3 |
| titanium dioxide | 3 |
| abietic acid | 2 |

The compositions shown in Table I may be cured by using conventional processes such as compression molding, injection molding and the like. For example, a molded rubber product may be produced by molding a composition comprising the halogenated uncrosslinked initial copolymer of the present invention, the curing agent and the dienophile in a conventional compression molding process at curing conditions including a temperature ranging from 160° to 200° C. If desired, before the molding step, the composition may be calendered to form a sheet at a temperature below the curing temperature and subsequently introducing the sheet (premold) into the compression mold in which the composition is subjected to pressure and curing temperature.

The initial uncrosslinked halogen-containing unsaturated polymers

The initial uncrosslinked halogen-containing unsaturated polymers suitable for use in the curing step of the process of the present invention include halogen-containing copolymers of a $C_4$ to $C_7$ isomonoolefin and a $C_4$ to $C_{14}$ multiolefin (i.e., halobutyl polymers). The uncrosslinked halogen-containing copolymer comprises: (1) at least one, but generally more than one, unsaturated monomeric moiety which has a carbon to carbon double bond (olefinic unsaturation) and which does not have a chemically bound halogen atom, and (2) at least one, but generally more than one, unsaturated monomeric moiety which comprises a carbon to carbon double bond and a chemically bound allylic halogen, that is, a halogen atom attached to the allylic carbon atom. The copolymer additionally comprises a $C_4$ to $C_7$ isomonoolefin moiety.

The chemically bound halogen may be chlorine, bromine and mixtures thereof. The chemically bound halogen may be present in the uncrosslinked initial copolymer in an amount ranging from about 0.05 to about 0.4, preferably from about 0.05 to about 0.39, more preferably from about 0.1 to about 0.35 weight percent chlorine or from about 0.05 to about 0.5, preferably from about 0.05 to about 0.49, more preferably from about 0.1 to about 0.45 weight percent bromine and mixtures thereof. When mixtures of halogen are employed, the bromine content limits apply except that the chlorine content should not exceed about 0.4 weight percent. The total unsaturation of the initial uncrosslinked halogen-containing unsaturated polymers may suitably range from about 0.05 to 5, preferably from about 0.50 to 2.5, more preferably from about 0.10 to 2.0 mole percent.

The halogen-containing copolymer of an isomonoolefin and a multiolefin are obtained by the halogenation of a copolymer of a $C_4$ to $C_7$ isomonoolefin and a $C_4$ to $C_{14}$ multiolefin, hereinafter referred to as "butyl rubber".

The useful copolymers comprise a major portion of isomonoolefin and a minor amount, preferably not more than 30 wt. percent, of a conjugated multiolefin. The preferred copolymers comprise about 85–99.5 wt. percent (preferably 95–99.5 wt. percent) of a $C_4$–$C_7$ isomonoolefin, such as isobutylene, and about 15–0.5 wt. percent (preferably about 5–0.5 wt. percent) of a multiolefin of about 4–14 carbon atoms. These copolymers are referred to in the patents and literature as "butyl rubber"; see, for example, the textbook *Synthetic Rubber* by G. S. Whitby (1954 edition by John Wiley and Sons, Inc.), pages 608–609, etc. The term "butyl rubber", as used herein, includes the aforementioned copolymers of an isomonoolefin having 4–7 carbon atoms and about 0.5 to 20 wt. percent of a conjugated multiolefin of about 4–14 carbon atoms. Preferably these copolymers contain about 0.5 to about 5 percent conjugated multiolefin. The preferred isomonoolefin is isobutylene. Suitable conjugated multiolefins include isoprene, butadiene, dimethyl butadiene, piperylene, etc. The preferred conjugated multiolefin is isoprene.

Commercial butyl rubber is a copolymer of isobutylene and minor amounts of isoprene. It is generally prepared in a slurry process using methyl chloride as a vehicle and a Friedel-Crafts catalyst as the polymerization initiator. The methyl chloride is liquid at $-100°$ C. and offers the advantage that $AlCl_3$, a relatively inexpensive Friedel-Crafts catalyst is soluble in it, as are the isobutylene and isoprene comonomers. Additionally, the butyl rubber polymer is insoluble in the methyl chloride and precipitates out of solution as fine particles that thereby forms a slurry. The polymerization is generally carried out at temperatures of about $-90°$ C. to $-100°$ C. See U.S. Pat. Nos. 2,356,128 and 2,356,129 incorporated herein by reference.

The polymerization process, which is typically carried out in a draft tube reactor, is continuous. Monomer feed and catalyst are continuously introduced at the bottom of the draft tube where an axial flow pump is located. The pump circulates the slurry at high velocity to provide efficient mixing and heat transfer. Polymer slurry containing about 20-30 wt. percent butyl rubber continuously overflows from the reactor through a transfer line.

Where the desired product is the butyl rubber itself, the slurry is fed through the transfer line to a flash drum operated at about 140-180 Pa (1.38-1.58 atm) and 65°-75° C. Steam and hot water are mixed with the slurry in a nozzle as it enters the drum to vaporize methyl chloride and unreacted monomers which pass overhead, are recovered, and the polymer is finished by water removal and drying. Where, however, it is desired to produce a halogenated butyl rubber, this can be accomplished by preparing a solution of the rubber. Generally, any halogenation technique may be utilized, including solution halogenation and melt phase halogenation.

In one preferred method of halogenation, a "solvent replacement" process is utilized. Cold butyl rubber slurry in methyl chloride from the polymerization reactor is passed to an agitated solution in a drum containing liquid hexane. Hot hexane vapors are introduced to flash overhead the methyl chloride diluent and unreacted monomers. Dissolution of the fine slurry particles occurs rapidly. The resulting solution is stripped to remove traces of methyl chloride and monomers, and brought to the desired concentration for halogenation by flash concentration. Hexane recovered from the flash concentration step is condensed and returned to the solution drum.

In the halogenation step of the process, butyl rubber in solution is contacted with chlorine or bromine in a series of high-intensity mixing stages. Hydrochloric or hydrobromic acid is generated during the halogenation step and must be neutralized. For a detailed description of the halogenation process see U.S. Pat. Nos. 3,029,191 and 2,940,960, as well as U.S. Pat. No. 3,099,644 which describes a continuous chlorination process, all of which patents are incorporated herein by reference.

The uncrosslinked halogen-containing initial copolymers suitable for use in the curing step of the present invention may be obtained by halogenating an uncrosslinked unsaturated butyl rubber having a concentration of unsaturation which falls within the desired previously stated ranges for the initial halogenated uncrosslinked polymer.

The low concentration of halogen in the halogenated butyl rubber can be achieved by alternative means. In one method of preparation, the butyl rubber containing a low concentration of double bonds, e.g., by means of enchained isoprene, is halogenated in a 1:1 molar ratio, thereby incorporating approximately one halogen atom for each double bond originally present in the butyl rubber. Alternatively, butyl rubber comprising a concentration of such double bonds greater than is required based on the preferred concentration of halogen, is only partially halogenated, thereby retaining unhalogenated double bond moieties. Where partially halogenated butyl rubber is used, the concentration of unhalogenated double bonds is generally from about 0.12 to about 1.88 mole percent; preferably from about 0.12 to about 0.75 mole percent.

The following examples are presented to illustrate the invention. Unless otherwise indicated, all parts and percentages are by weight.

EXAMPLE 1

The following uncrosslinked halogenated butyl rubber was used as initial polymer for the preparation of crosslinked polymers of the present invention:

Polymer A was a copolymer of isobutylene and isoprene having about 1.0 to 1.2 mole percent unsaturation and 0.4 wt. percent chemically bound chlorine, a Mooney viscosity (1+8) at 125° C. of 57 as measured in accordance with test ASTM D-1646. Polymer A also contained 0.98 wt. percent calcium stearate which was used in its preparation.

The formulations shown in Table II were tested to determine their rheological properties, their physical properties and their extractability. The results of these tests are shown on Table III.

TABLE II

| Formulation | R | S | T |
|---|---|---|---|
| Polymer A | 100 | 100 | 100 |
| Polestar 200 R[1] | 50 | 50 | 50 |
| Cyprubond[2] | 40 | 40 | 40 |
| Parapol 2225[3] | 5 | 5 | 5 |
| TiO2 | 4 | 4 | 4 |
| ZnO | 0.5 | 2 | 2 |
| HVA-2[4] | 1 | 1 | 1 |
| Stearic acid | 1 | 1 | none |
| Neodecanoic Acid | none | none | 1 |

Footnotes:
[1] Polestar 200 R is calcined clay, trademark name of Exxon Chemical International Ltd.
[2] Cyprubond -40 is silane-treated talc, Cyprus Industrial Mineral Corp.
[3] Parapol 2225 is an isobutene-butene low molecular weight copolymer supplied by Exxon Chemical Co.
[4] HVA-2 is N'-N'-m-phenylenedimaleimide supplied by DuPont.

All parts in Table II are parts by weight based on 100 parts of Polymer A.

TABLE III

| Reho Results 180°, 3° arc (ASTM D2048) | | | |
|---|---|---|---|
| $M_L$, lbs-inch | 12.1 | 12.0 | 12.9 |
| $M_H$, lbs-inch | 31.6 | 28.9 | 27.6 |
| $M_H$-$M_L$ lbs-inch | 19.5 | 16.9 | 14.7 |
| $t_{s2}$, minS | 2.4 | 2.4 | 2.8 |
| $t_{90}$, minS | 8.5 | 7.7 | 7.4 |
| Physical Properties, 8 min press cure at 180° C. (ASTM D-412) | | | |
| Shore A | 42.5 | 42.5 | 41.0 |
| 100 Mod., MPa | 1.34 | 1.23 | 1.18 |
| 300 Mod., MPa | 2.45 | 2.25 | 2.59 |
| Tensile Strength, MPa | 8.5 | 7.8 | 8.0 |
| Elongation, % | 710 | 710 | 725 |
| Tear, Die C, kN/m | 21 | 20.5 | 23.5 |
| Extraction Test, DIN 58367 | | | |
| PH change | −0.05 | −0.07 | −0.38 |

TABLE III-continued

| | | | |
|---|---|---|---|
| Reducting substances ml KMnO4 0.01 N | 0.1 | 0.00 | 0.05 |
| Zinc, ppm | 0.05 | 0.14 | 1.7 |

As can be seen from the extraction tests shown in Table III, formulations R, S, and T, which are formulations in accordance with the present invention, are particularly well suited for use as stoppers for containers comprising pharmaceutical products in view of their exhibiting low extractability of their components and their relatively low level of components which could contaminate pharmaceutical products with which they may be in contact.

What is claimed is:

1. A process for preparing a crosslinked unsaturated copolymer of a $C_4$ to $C_7$ isomonoolefin and a $C_4$ to $C_{14}$ conjugated multiolefin which comprises the steps of: contacting at a temperature of between about 100° and 260° C. for a period of up to 15 minutes, an uncrosslinked, unsaturated halogen-containing copolymer of a $C_4$ to $C_7$ isomonoolefin and a $C_4$ to $C_{14}$ conjugated multiolefin comprising an unsaturated non-halogen containing moiety and an unsaturated chemically bound allylic halogen-containing moiety, said halogen being selected from the group consisting of from about 0.05 to 0.4 weight percent chlorine, from about 0.05 to 0.5 weight percent bromine and mixtures thereof, in the presence of a curing mixture comprising (a) at least one curing agent which reacts essentially only with said allylic halogen, and (b) at least one bifunctional dienophile selected from the group consisting of a bismaleimide, a polyacrylate, a methacrylic ester, a para-benzoquinone, and mixtures thereof.

2. The process of claim 1, wherein said curing agent (a) is selected from the group consisting of metal salts, metal oxides, and metal powders of a metal of Group IIA and IIB of the Periodic Table of Elements, copper, iron, and mixtures thereof.

3. The process of claim 2, wherein said curing agent (a) comprises zinc oxide.

4. The process of claim 1, wherein said bifunctional dienophile is a bismaleimide selected from the group consisting an aliphatic bismaleimide, an aromatic bismaleimide and mixtures thereof.

5. The process of claim 1, wherein said curing agent (a) is present in said contacting step in a molar ratio of curing agent to said chemically bound halogen of at least about 0.25:1 and wherein said bifunctional dienophile is present in a molar ratio of dienophile to said chemically bound halogen of at least 0.25:1.

6. The process of claim 1, wherein said curing agent (a) is present in said contacting step in a molar ratio of curing agent (a) to said chemically bound halogen of at least about 0.5:1 and said dienophile is present in a molar ratio of dienophile to chemically bound halogen of at least about 0.5:1.

7. The process of claim 1, wherein said chemically bound halogen is chlorine and wherein said chlorine is present in an amount ranging from about 0.05 to about 0.39 weight percent, based on said uncrosslinked halogen-containing copolymer.

8. The process of claim 1, wherein said chemically bound halogen is bromine and wherein said bromine is present in an amount ranging from about 0.05 to about 0.49 weight percent, based on said uncrosslinked halogen-containing copolymer.

9. The process of claim 1, wherein said crosslinks are present in said crosslinked copolymer at a density ranging from about 0.15 to $0.50 \times 10^{-4}$ moles per cubic centimeter and a gel content ranging from about 90 to about 100 weight percent.

10. The process of claim 1, wherein said crosslinked copolymer has an olefinic unsaturation ranging from about 0.50 to about 2.5 mole percent.

11. The process of claim 1, wherein said crosslinked copolymer is a copolymer of isobutylene and isoprene, said curing agent (a) is zinc oxide and said dienophile is N,N'-m-phenylene bismaleimide.

12. The crosslinked unsaturated copolymer produced by the process of claim 1.

13. The crosslinked unsaturated copolymer produced by the process of claim 2.

14. The crosslinked unsaturated copolymer produced by the process of claim 3.

15. The crosslinked unsaturated copolymer produced by the process of claim 4.

16. The crosslinked unsaturated copolymer produced by the process of claim 5.

17. The crosslinked unsaturated copolymer produced by the process of claim 6.

18. The crosslinked unsaturated copolymer produced by the process of claim 7.

19. The crosslinked unsaturated copolymer produced by the process of claim 8.

20. The crosslinked unsaturated copolymer produced by the process of claim 9.

21. The crosslinked unsaturated copolymer produced by the process of claim 10.

22. The crosslinked unsaturated copolymer produced by the process of claim 11.

23. A shaped rubbery product prepared by the steps which comprise: shaping at a temperature of between about 100° and 260° C. for up to 15 minutes, a composition comprising an uncrosslinked, unsaturated halogen-containing copolymer of a $C_4$ to $C_7$ conjugated multiolefin comprising an unsaturated chemically bound allylic halogen containing moiety, said halogen being selected from the group consisting of from 0.05 to 0.4 weight percent chlorine, from about 0.05 to 0.5 weight percent bromine and mixtures thereof; and a curing mixture comprising at least one curing agent with reacts essentially only with said allylic halogen; and at least one bifunctional dienophile selected from the group consisting of a bismaleimide, a polyacrylate, methacrylic esters, and mixtures thereof, to produce a shaped rubbery product comprising the corresponding crosslinked unsaturated copolymer of a $C_4$ to $C_7$ isomonolefin and a $C_4$ to $C_{14}$ conjugated multiolefin.

24. The shaped rubbery product of claim 23, wherein said shaped rubbery product is an extruded rubbery product and wherein said shaping step is an extrusion step.

25. The shaped rubbery product of claim 23, wherein said shaped rubbery product is a molded rubbery product and wherein said shaping step is a molding step.

26. The shaped rubbery product of claim 25, wherein prior to said molding step, said composition is calendered at a temperature below the curing temperature of said uncrosslinked, unsaturated halogen-containing copolymer.

27. The shaped rubbery product of claim 23, wherein said curing agent (a) is selected from the group consisting of metal salts, metal oxides, and metal powders of a metal of Group IIA and IIB of the Periodic Table of Elements, copper, iron, and mixtures thereof.

28. The shaped rubbery product of claim 27, wherein said curing agent (a) comprises zinc oxide.

29. The shaped rubbery product of claim 27, wherein said bifunctional dienophile is a bismaleimide selected from the group consisting of an aliphatic bismaleimide, an aromatic bismaleimide and mixtures thereof.

30. The shaped rubbery product of claim 23, wherein said curing agent (a) is present in a molar ratio of curing agent to said chemically bound halogen of at least about 0.25:1, and wherein said dienophile is present in a molar ratio of dienophile to said chemically bound halogen of at least 0.25:1.

31. The shaped rubbery product of claim 23, wherein said curing agent (a) is present in said shaping step in a molar ratio of curing agent (a) to said chemically bound halogen of at least about 0.5:1 and said dienophile is present in a molar ratio of dienophile to chemically bound halogen of at least about 0.5:1.

32. The shaped rubbery product of claim 23, wherein said chemically bound halogen is chlorine and wherein said chlorine is present in an amount ranging from about 0.05 to about 0.39 weight percent, based on said uncrosslinked halogen-containing copolymer.

33. The shaped rubbery product of claim 23, wherein said chemically bound halogen is bromine and wherein said bromine is present in an amount ranging from about 0.05 to about 0.49 weight percent, based on said uncrosslinked halogen-containing copolymer.

34. The shaped rubbery product of claim 23, wherein said crosslinks are present in said crosslinked copolymer at a density ranging from about 0.15 to $0.50 \times 10^{-4}$ moles per cubic centimeter and a gel content ranging from about 90 to about 100 weight percent.

35. The shaped rubbery product of claim 23, wherein said crosslinked copolymer has an olefinic unsaturation ranging from about 0.50 to about 2.5 mole percent.

36. The shaped rubbery product of claim 23, wherein said crosslinked copolymer is a copolymer of isobutylene and isoprene, said curing agent (a) is zinc oxide and said dienophile is N,N'-m-phenylene bismaleimide.

37. The shaped rubber product of claim 23, wherein said shaped product is a closure for pharmaceutical containers.

38. The shaped rubber product of claim 23, wherein said shaped product is an eye drop dispenser.

* * * * *